No. 616,818. Patented Dec. 27, 1898.
J. C. H. BAGGER.
TIRE.
(Application filed Apr. 29, 1898.)
(No Model.)
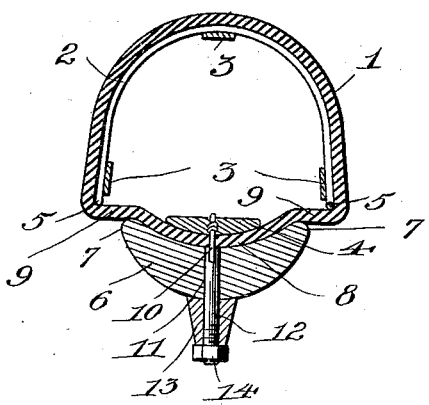
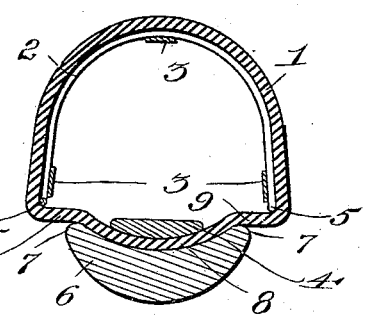
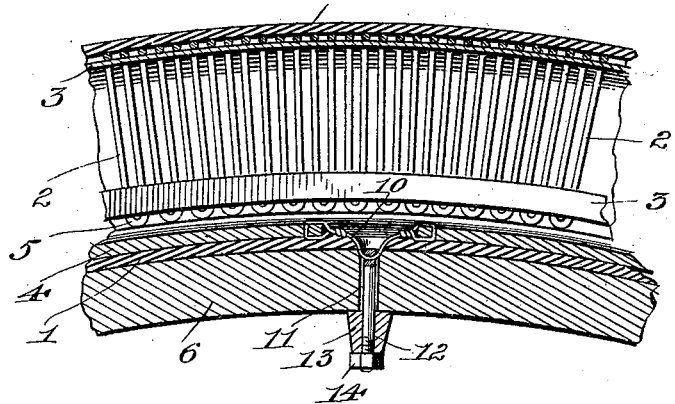
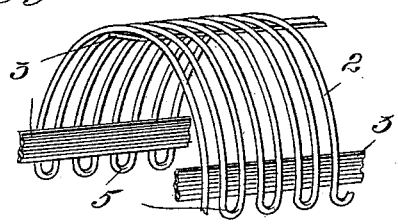
Witnesses
Inventor
Jacob C. H. Bagger.
his Attorney.

UNITED STATES PATENT OFFICE.

JACOB C. H. BAGGER, OF CORDESVILLE, SOUTH CAROLINA.

TIRE.

SPECIFICATION forming part of Letters Patent No. 616,818, dated December 27, 1898.

Application filed April 29, 1898. Serial No. 679,229. (No model.)

*To all whom it may concern:*

Be it known that I, JACOB C. H. BAGGER, a citizen of the United States, residing at Cordesville, in the county of Berkeley and State of South Carolina, have invented certain new and useful Improvements in Tires; and I do hereby declare the following to be a full, clear, and exact description of the invention, such as will enable others skilled in the art to which it appertains to make and use the same.

This invention relates to tires; and the object in view is to provide a mechanically-resilient tire which will take the place of the ordinary pneumatic tire, thereby obviating the liability of puncturing incident to the use of pneumatic tires.

It is also the object of the invention to provide novel and efficient means for securing the tire in place upon the rim of a wheel, so that it may be readily detached and a new outer casing or cover applied when the old casing is worn out or unfit for use.

The detailed objects and advantages of the invention will be pointed out in the course of the subjoined description.

The invention consists in a tire embodying certain novel features and details of construction, as hereinafter fully set forth, illustrated in the drawings, and incorporated in the claims.

In the accompanying drawings, Figure 1 is a cross-sectional view of a tire constructed in accordance with the present invention, taken in line with the securing means. Fig. 2 is a similar view taken out of line with the securing means. Fig. 3 is a longitudinal section through the tire and rim, showing the securing means. Fig. 4 is a detail perspective view of a short section of the spring and the stays which join the several coils thereof.

Similar numerals of reference designate corresponding parts in all the views.

The tire contemplated in this invention embodies an outer rubber casing or tube 1, the spring 2, the stays 3, and the securing-band 4. The outer tube or casing 1 may be similar to any single-tube tire and is, for the purpose of carrying out the present invention, provided along its inner or rim surface with a longitudinal slit extending entirely around the tire, the edges bounding said slit being designed to be secured together by a suitable lacing similar to the outer tube of a double-tube pneumatic tire.

Arranged within the tube 1 is a continuous spring 2, which is substantially U-shaped in cross-section. The spring is composed of a multiplicity of coils or sections, which lie in parallel relation to each other, the spring-wire from which the coils are formed being bent first in U shape, as shown in the cross-sectional view, and then recurved at the point 5, after which it is bent back in parallel relation to itself, leaving, however, a short intervening space for increasing the yielding action of the spring as a whole. The ends of the recurved extremities 5 of the spring are thus rounded and prevented from puncturing or abrading the tire, and the terminal portions of the spring are slightly divergent, so as to be located in planes outside of the side edges of the rim, the latter being indicated at 6, and the edges thereof being rounded, as indicated at 7, to prevent undue wear of the tire.

By the arrangement above described the inner surface of the tire is approximately flat, except that portion 8 which enters the concavity of the rim, wherein it is secured by the band 4. The portions 9 of the tire between the edges 7 of the rim and the outer side faces of the tire are substantially horizontal, and it is at these points that the greatest resiliency of the tire is obtained. In order to retain the coils of the spring in their proper relative positions at the tread portion of the tire, I employ a spring-metal strip or stay 3, and the terminal or recurved portions of the coils are also connected to similar strips or stays 3, as shown.

The securing-band 4 extends entirely around within the tire, the edges of the tire being securely laced around the same. The band 4 is divided transversely at a single point and is slightly less in length than the outer periphery of the rim. Attached to the adjacent ends of the band 4 are wires or other flexible pieces 10, which pass into and partially through an opening 11 in the rim, where they connect with an eyebolt 12. The bolt extends through the inner side of the rim and projects and is surrounded by a conical sleeve 13, the projecting end of which forms a seat for a nut 14, by means of which the bolt 12 can be drawn toward the center of the wheel, thereby correspondingly drawing upon the wires or flexible pieces 10 and forcing the ends of the securing-band 4 toward each other. By this means the band is caused to firmly clamp the rim portion of the tire against the rim, and the tire may be further secured by means of cement interposed between it and the rim in the ordinary manner.

From the foregoing description it will be seen that I have provided a simple, cheap, and practicable tire which will not be affected by puncturing, as in the case of an ordinary pneumatic tire. The tire does not depend for its spring action or resiliency solely upon the spring 2; but it will be apparent that the portions 9 of the outer casing between the edges of the rim and the outer side faces of the tire will also add materially to such spring action. By increasing or diminishing the distance between the points 5 and 7 the resiliency of the tire may be proportionately varied.

Having thus described the invention, what is claimed as new, and desired to be secured by Letters Patent, is—

1. In a tire, an outer resilient casing, in combination with a rim, and a spring of substantially U shape, having its opposite end portions located in planes outside of the side edges of the rim, substantially as described.

2. In a tire, the combination with a rim, and an outer resilient casing, of a continuous spring substantially U-shaped in cross-section and consisting of a series of coils or bends extending in parallel relation to each other, the end portions of the spring being arranged in planes outside of the side edges of the rim, substantially as described.

3. In a tire, the combination with an outer resilient casing, and a rim, of a substantially U-shaped spring composed of a plurality of coils or bends extending in parallel relation to each other, the end portions of the spring being arranged in planes outside of the side edges of the rim, and metal stays connecting the coils of the spring for maintaining the proper relative positions thereof, substantially as described.

In testimony whereof I affix my signature in presence of two witnesses.

JACOB C. H. BAGGER.

Witnesses:
J. L. WEEKS,
A. M. VENGTORY.